United States Patent Office 3,629,294
Patented Dec. 21, 1971

3,629,294
EPOXIDATION PROCESS
Jui-Yuan Sun, Riverdale, Ill., assignor to Atlantic Richfield Company, New York, N.Y.
No Drawing. Filed Nov. 21, 1969, Ser. No. 878,947
Int. Cl. C07d 1/08, 1/12
U.S. Cl. 260—348.5 V           8 Claims

ABSTRACT OF THE DISCLOSURE

A process for the liquid phase epoxidation of olefinic compounds to their corresponding epoxides which comprises reacting an olefinic compound with molecular oxygen in the presence of catalytic amounts of a copper compound and molybdenum under mild conditions to produce substantial yields of the corresponding epoxide and substantial yields of highly reactive and valuable corresponding co-products of alcohols and ketones.

---

This invention relates to a process for the production of oxiranes, and more particularly, to the liquid phase catalytic epoxidation of olefinic compounds to their corresponding epoxides using molecular oxygen as the epoxidation reagent. The process also produces substantial yields of valuable, highly reactive, allylic hydroxyl compounds which can be converted into many important commercial products.

Purportedly, propylene has been oxidized with air in benzene at 180° C. to produce a total yield of 38.8% propylene oxide and propylene glycol and its esters. It is also reported that propylene has been oxidized noncatalytically with molecular oxygen at elevated pressures and elevated temperatures of 150–250° C. in a polyacylated ester such as propylene glycol diacetate to yield 40–45% propylene oxide and 10–20% acetic acid at 20–50% conversion. Other by-products are methanol, acetaldehyde, formic acid, methyl acetate, methyl formate and acetone.

Apparently, propylene has also been epoxidized by oxygen catalyzed by tributoxyboroxine in the presence of cyclohexane at 163° C. to produce low yields of propylene oxide.

The process of this invention is advantageous because it is a simple, inexpensive, single-stage operation which does not require special equipment. Good yields of epoxides can be obtained under mild conditions of low temperatures and pressures.

The process is also advantageous in that it provides substantial yields of highly reactive and valuable allylic hydroxyl compounds which can be converted into important commercial products. Also, due to its generally low concentration of peroxides, the process is free from the hazard of explosion.

Briefly, this invention involves a process for the liquid phase epoxidation of olefinic compounds with comprises reacting an olefinic compound with molecular oxygen in the presence of a copper compound and molybdenum. The reaction is carried out at a temperature of from about 40° to 120° C., preferably from about 60° to 100° C. and at a pressure sufficient to maintain a liquid phase. The partial pressure of oxygen is conveniently up to about one atmosphere or more, for instance, it can be at least about 100 mm. Hg, but preferable oxygen partial pressures are from about 500 to 700 mm. Hg.

Olefinically-unsaturated compounds which can be epoxidized in accordance with the present invention are aliphatic and cycloaliphatic monoalkenes having an allylic hydrogen atom and having at least 3 to about 20 or more carbon atoms. The preferred olefinically-unsaturated compounds are those which are terminally olefinically-unsaturated and which have branched chains. Examples of monoolefins which can be used are: acyclic olefins having straight chains such as heptene-1, octene-2, butene-1 and butene-2, and those having branched chains such as 2-methyl pentene-2; and, cyclic olefins, such as cyclohexene and 1-methylcyclohexene. The olefins can have substituents which do not interfere with the desired reaction. The cyclic monoolefins are generally more reactive than the acyclic ones.

The olefinically unsaturated compounds can be utilized in their liquid form per se or they can be employed in a solvent. However, it is advantageous to use the compounds in their liquid forms per se since better reaction rates are obtained with higher concentrations of olefin and since use of a solvent creates problems in separating it from desired reaction products.

The epoxidation agent of this invention is molecular oxygen. Its source can be oxygen of high concentration such as commercial oxygen or of less concentration, such as air.

The copper and molybdenum catalysts employed in the process of this invention should each be present in an amount sufficient to enhance the reaction of the olefinic compound with molecular oxygen under mild conditions to yield epoxides and allylic alcohols. Although ample catalytic amounts result in a more reactive system, relative amounts should be controlled so that most of the hydroperoxide will be consumed as it is formed and its amount in the system can be kept low, for example, below about 1 weight percent of the reaction mixture. Usually, a minor molar catalytic amount based on the olefin charged to the system is used.

The copper compound catalyst employed in the process of this invention is insoluble in the reaction mixture and can be, for example, a copper oxide or an organic or inorganic copper salt. An especially suitable copper compound is copper phthalocyanine. The copper compound employed should be in a catalytic amount such as from about 0.001 to 0.01 mole, preferably from about 0.001 to 0.008 mole, per mole of olefin charged to the system.

The molybdenum catalysts which can be employed in this invention are those which are insoluble in the reaction mixture, for example, the inorganic salts, oxides such as $MoO_2$ and $MoO_3$ or organic chelates of molybdenum. Other insoluble forms of the metal can be those compounds including alkali metals, e.g., sodium molybdate. Although molybdenum could be used in its elemental form, the catalyst is preferably a molybdenum compound, especially molybdenum dioxide. The molybdenum catalyst should be employed in a catalytic amount such as about 0.001 to 0.02 mole, preferably about 0.001 to 0.005 mole, per mole of olefin charged to the system. The copper and molybdenum catalysts can be carried on a solid support, especially a relatively porous, high surface area material.

No solvent is needed in the reaction of this invention when the olefinic feed is a liquid or can be liquefied under pressure at the reaction temperature. When the olefinic compound will not liquefy under such conditions, an inert solvent can be used to dissolve the olefin. Among suitable substances which can serve as solvents are those inert to the system, such as, aliphatic, aromatic or chlorinated aromatic hydrocarbon compounds. An example of a suitable solvent is chlorobenzene.

Reaction conditions used in the process of this invention are mild. Mild conditions produce less side reactions. Reaction temperatures affect the rate that oxygen is absorbed in the system; the higher the temperature, the more rapid the absorption. Reaction times applied in the process of this invention depend upon temperatures and catalyst concentrations employed. Reaction conditions which produce high yields of epoxides and allylic hydroxyl compounds include reaction times which can range from about 30 minutes to about 24 hours or more, preferably from about 4.5 or less to about 20 hours. A reaction time of from about 2 to 8 hours is usually employed.

Although other procedures can be employed in the process of this invention, preferred embodiments for carrying out the process of this invention are illustrated by the following examples.

For each example, a mixture of 0.5 mole of cyclohexene, 0.001 mole of copper phthalocyanine and 0.002 mole of molybdenum dioxide were charged into a 500 ml. round bottom flask equipped with a magnetic stirrer. The flask was evacuated to remove air and was immersed in a constant temperature oil bath. Oxygen was introduced through a condenser to the top of the flask and the reaction mixture was stirred to obtain adequate mixing of its phases. Reaction time commenced when oxygen was introduced into the flask. The partial pressure of oxygen was kept constant at 600 mm. Hg by means of a pressure control device. Periodic readings of the change in pressure of an oxygen reservoir containing a known volume of oxygen, were made to calculate the amount of oxygen absorbed during the reaction. When the desired conversion of olefin was obtained oxygen flow was terminated and the reaction temperature was readjusted to 80° C., and held at this temperature for one hour to ensure the completion of epoxidation of the olefin. At the end of one hour, the reaction mixture was filtered to remove the catalysts. The composition of the filtrate was determined by gas chromatography and the organic peroxides in the filtrate were analyzed by iodine liberation procedure.

This process was carried out in each of four examples. Reaction temperatures, reaction times, percent conversions of cyclohexene, and yields of cyclohexene oxide, alcohol, ketone and unidentified products including the weight percent of 3-hydroperoxycyclohexene for each example, are given in Table I. The table illustrates the effect of reaction temperature with the same feed of cyclohexene on rate of epoxidation and yields. It is significant to note that a rather slight rise in temperature hardly varies the yield of epoxide but greatly reduces reaction time.

It is also noteworthy that the reaction times shown below were selected to obtain comparable conversions. Increased conversions are obtained by extending reaction times.

TABLE I

| Example No. | 1 | 2 | 3 | 4 |
| --- | --- | --- | --- | --- |
| Reaction temperature (° C.) | 60 | 70 | 75 | 80 |
| Reaction time (hrs.) | 20 | 8.5 | 6.5 | 4.5 |
| Conversion (mole percent) | 36.3 | 39.8 | 38.5 | 38.5 |
| Yield (mole percent): | | | | |
| Cyclohexene oxide | 47.6 | 47.8 | 45.5 | 44.4 |
| 2-cyclohexene-1-ol | 33.2 | 34.0 | 32.3 | 32.0 |
| 2-cyclohexene-1-one | 11.5 | 12.4 | 12.4 | 12.6 |
| Unidentified products including— | 7.7 | 5.8 | 9.8 | 11.0 |
| 3-hydroperoxycyclohexene (wt. percent) | 0.52 | 0.69 | 0.65 | 0.71 |

In accordance with the procedure mentioned for the above examples, heptene-1 is oxidized to 1,2-epoxyheptane and 3-hydroxy-heptene by using 0.001 mole of copper phthalocyanine, 0.004 mole of molybdenum dioxide at a temperature of 100° C., an oxygen partial pressure of 600 mm. Hg and a reaction time of 6 hours.

Also, 0.4 mole of cis-2-octene is oxidized to 2,3-epoxyoctane and 4-hydroxy-2-octene by using 0.0008 mole of copper phthalocyanine, 0.0032 mole of ground molybdenum dioxide at a temperature of 100° C., an oxygen partial pressure of 600 mm. Hg and a reaction time of 5 hours.

Generally, under the process of this invention, yields to epoxide and allylic alcohol can be about 80% of the olefin reacted with the yield of epoxide being about 45%. Some $\alpha$- and $\beta$-unsaturated carbonyl compounds were also detected, and are formed at least in part from the oxidation of allylic alcohols during the reaction.

It is claimed:
1. A process for the liquid phase epoxidation of aliphatic or cyclic monoalkenes of 3 to about 20 carbons which comprises reacting in the liquid phase the monoalkene with molecular oxygen in the presence of catalytic amounts of each of copper phthalocyanine and molybdenum dioxide as the sole catalysts at a temperature of from about 40° to 120° C., said copper and molybdenum catalysts being insoluble in the reaction mixture.

2. The process of claim 1 wherein from about 0.001 to 0.01 mole of said copper phthalocyanine is employed for each mole of said monoalkene.

3. The process of claim 2 wherein from about 0.001 to 0.02 mole of molybdenum dioxide is employed for each mole of said monoalkene.

4. The process of claim 2 wherein from about 0.001 to about 0.005 mole of said molybdenum dioxide is employed for each mole of said monoalkene.

5. The process of claim 1 wherein said temperature is from about 60° to 100° C.

6. The process of claim 4 wherein said monoalkene is cis-2-octene.

7. The process of claim 4 wherein said monoalkene is heptene-1.

8. The process of claim 4, wherein said monoalkene is cyclohexene.

References Cited

FOREIGN PATENTS

| 1,505,337 | 11/1967 | France | 260—348.5 V |
| 22,575 | 10/1965 | Japan | 260—348.5 V |
| 18,662 | 9/1963 | Japan | 260—348.5 V |

NORMA S. MILESTONE, Primary Examiner